United States Patent [19]
Donohue et al.

[11] Patent Number: 6,026,582
[45] Date of Patent: Feb. 22, 2000

[54] METHODS AND APPARATUS FOR MAPPING PIPE AND VALVE BORES IN A NUCLEAR REACTOR

[75] Inventors: James C. Donohue, Sharon Hill; Benedict Kazirskis, Barto, both of Pa.

[73] Assignee: General Electric Company, Schenectady, N.Y.

[21] Appl. No.: 08/842,862

[22] Filed: Apr. 17, 1997

Related U.S. Application Data

[60] Provisional application No. 60/033,595, Dec. 20, 1996.

[51] Int. Cl.[7] .......................... E21B 47/08; G01B 21/14; G01B 5/12
[52] U.S. Cl. ............................... 33/502; 33/302; 33/544.1
[58] Field of Search ............................ 33/502, 302, 542, 33/544, 544.2, 544.1, 550, 551, 543, 544.3

[56] References Cited

U.S. PATENT DOCUMENTS

| | | | |
|---|---|---|---|
| 4,521,968 | 6/1985 | Wiltermood et al. | 33/542 |
| 4,571,848 | 2/1986 | Kreutz et al. | 33/544 |
| 4,627,168 | 12/1986 | Maples | 33/705 |
| 4,704,801 | 11/1987 | Frizot et al. | 33/502 |
| 5,396,712 | 3/1995 | Herzog | 33/503 |

*Primary Examiner*—Andrew Hirshfeld
*Assistant Examiner*—R A. Smith
*Attorney, Agent, or Firm*—Armstrong Teasdale LLP

[57] ABSTRACT

Methods and apparatus for mapping pipe and valve bores in a reactor pressure vessel (RPV) of a nuclear reactor are described. In one embodiment of the apparatus, a main bar and an adjustable chuck facilitate positioning of a digital indicator inside a valve bore. In the one embodiment, the main bar is rotatably coupled to the chuck, and the chuck includes four movable jaws. A data acquisition element, which includes a digital indicator, is movably coupled to the main bar and configured to move substantially coaxially to the main bar. To map the circumference of the bore, the main bar and the chuck are inserted into the valve bore, and the chuck is used to center the main bar coaxially within the valve bore. The data acquisition element is positioned at a first location along the main bar, and the main bar is rotated so that the digital indicator maps the circumference of the bore. The data acquisition element is then moved to different locations along the main bar to map the circumference of the bore at different locations.

14 Claims, 3 Drawing Sheets

METHODS AND APPARATUS FOR MAPPING PIPE AND VALVE BORES IN A NUCLEAR REACTOR

CROSS-REFERENCE TO RELATED APPLICATIONS

This application claims the benefit of U.S. Provisional Application Ser. No. 60/033,595, filed Dec. 20, 1996.

FIELD OF THE INVENTION

This invention relates generally to analyzing pipes and valves in nuclear reactors and, more particularly, to methods and apparatus for mapping bores of pipes and valves within such nuclear reactors.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds the both the core plate and the top guide. The top guide includes several openings, and fuel bundles are inserted through the openings and are supported by the core plate.

A plurality of openings are formed in the RPV so that valves, nozzles, and pipes can extend within the RPV. For example, water enters the RPV through an inlet nozzle in the RPV sidewall. Similarly, control rod drive housings, e.g., tubes, are inserted through the bottom head and extend into the RPV. Moreover, a known RPV typically includes several openings for pressure instrument nozzles, and at least one opening for a drain nozzle. Since these components, e.g., control rod drive housings and nozzles, penetrate into the RPV, the components sometimes are referred to in the art as penetration tubes.

Mechanical wear, thermal cracking, and stress corrosion cracking (SCC) are known phenomena occurring in reactor components, such as structural members, piping, nozzles, valves, fasteners, and welds, exposed to high temperature water. The reactor components are subject to a variety of stresses associated with, e.g., differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

To alleviate the effects of SCC, it typically is desirable to modify or upgrade existing pipes and valves within an RPV. When modifying or upgrading, for example, a valve, it is desirable to accurately map, or measure, the existing valve bore. Specifically, it is desirable to measure the roundness, diameter, sealing surface condition, concentricity and length of the valve bore before upgrading the valve.

One known method of measuring pipe and valve bores requires a person to manually measure such bores. Particularly, an operator typically must enter the bore area to measure the bore with a hand-held micrometer. This "hands on" approach, however, is both time consuming and difficult. Particularly, depending on the size and location of the pipe to be measured, it often is difficult for a person to accurately map the entire length of the bore. Furthermore, this method often is not practical because of the radiation levels and contamination levels associated with the location of the pipes and valves.

It would be desirable, therefore, to provide an apparatus for facilitating measuring pipe and valve bores in a nuclear reactor more easily and quickly than by known methods. It also would be desirable to provide such an apparatus to reduce operator exposure to radiation which measuring pipe and valve bores. It further would be desirable to provide such an apparatus which is inexpensive and easy to operate.

SUMMARY OF THE INVENTION

These and other objects may be attained by an apparatus for measuring pipe and valve bores in a nuclear reactor which, in one embodiment, includes a main bar, an adjustable chuck, and a data acquisition element. The main bar includes a first end and a second end. The second end of the main bar is rotatably coupled to the adjustable chuck with a substantially spherical bearing. The adjustable chuck includes a plurality of movable jaws, and each jaw includes an outer end which is configured to abut the surface of a bore. The adjustable chuck is coupled to the second end of the main bar so that the movable jaws are movable between a first position, wherein the outer ends of at least two of the jaws do not abut the surface of the bore, to a second position, wherein each jaw extends substantially radially from the main bar so that the outer end of each jaw abuts the surface of the bore.

The data acquisition element is movably coupled to the main bar and configured to move substantially coaxial thereto. Particularly, the data acquisition element includes a data acquisition housing having a data acquisition probe extending therefrom. A data acquisition bearing, which is a linear bearing, is secured within the data acquisition housing, and is coupled to the main bar at a location between the second end and the first end. The data acquisition probe extends from the data acquisition bearing so that it extends substantially radially from the main bar.

To map the bore with the above-described apparatus, the main bar and adjustable chuck are extended within the bore. The main bar is substantially centered within the bore by moving the chuck jaws so that the jaws extend substantially radially from the main bar and so that the outer end of each jaw abuts the valve bore surface. The data acquisition element is then moved to a first position between the chuck and the upper end of the main bar. The main bar is then rotated so that the data acquisition probe obtains data measurements relating to the bore surface about the circumference of the bore surface at the first position. The data acquisition probe is then substantially coaxially moved with respect to the main bar to a second position, and additional measurements are obtained about the circumference of the valve bore surface at the second position.

By using the above-described apparatus, a bore may be measured more easily and quickly than by known methods. In addition, such apparatus facilitates reducing operator radiation exposure per task. Moreover, such assembly is substantially inexpensive and easy to operate.

DETAILED DESCRIPTION OF THE DRAWINGS

Figure 1:
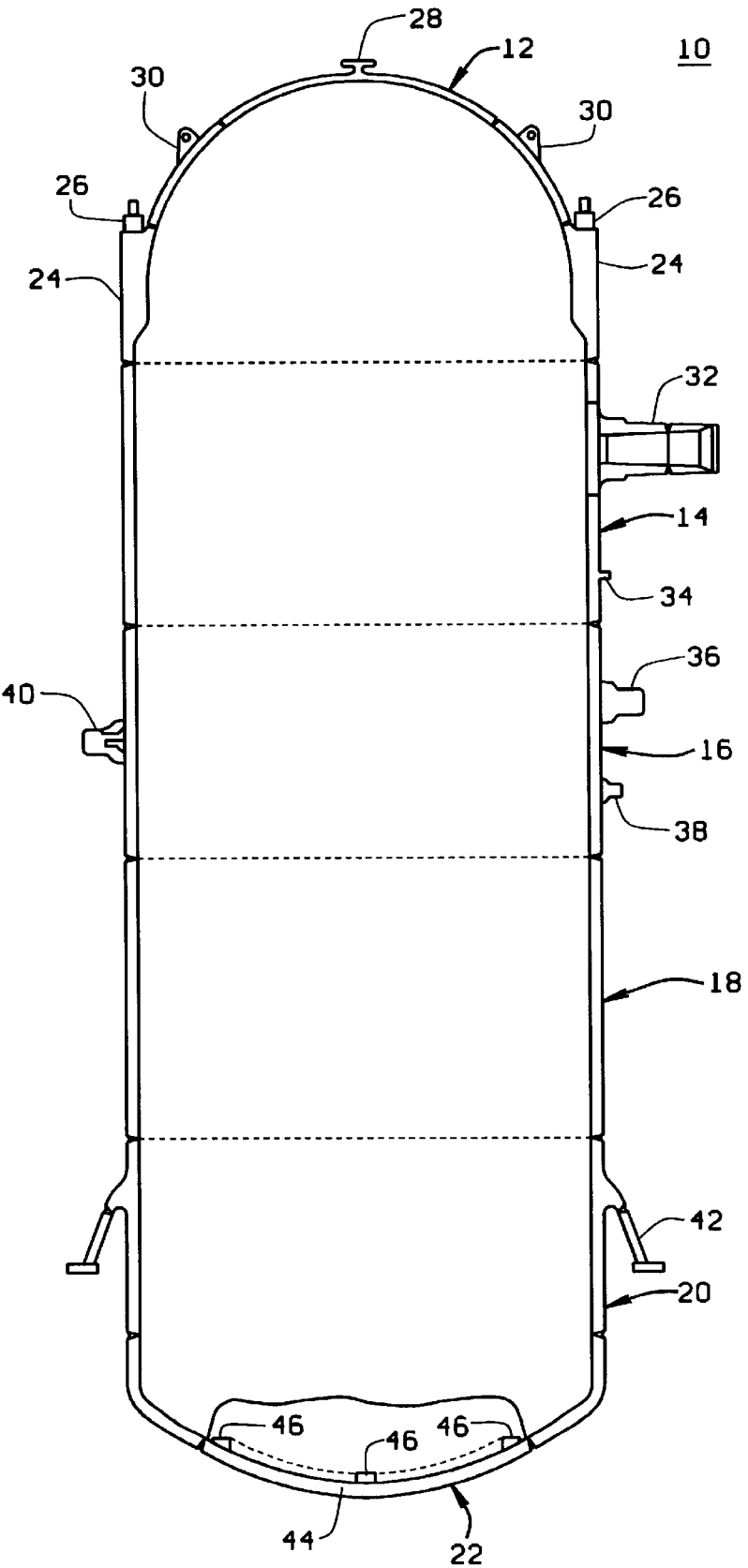
FIG. 1 is a schematic illustration of a reactor pressure vessel.

FIG. 1 is a schematic illustration of a reactor pressure vessel (RPV) 10. RPV 10 includes a top head 12, four substantially cylindrical shell courses 14, 16, 18 and 20, and a bottom head assembly 22. Top head 12 includes a head flange 24. First shell course 14 includes a vessel flange 25. Top head 12 is bolted to first shell course 14 by bolts 26 which extend through head flange 24. Top head 12 also includes a head spray and vent nozzle 28 and lifting flanges 30 used when lifting top head 12 from first shell course 14.

First shell course 14 includes main steam nozzles 32 through which steam flows out of the RPV 10. Stabilizer brackets 34 also are formed on first shell course 14. Second shell course 16 has a number of nozzles 36, 38 and 40 formed therein. Fourth shell course 20 includes a support skirt 42 welded thereto. Support skirt 42 is utilized to support RPV 10 within the reactor housing (not shown).

Bottom head assembly 22 includes a bottom head dome 44 having a plurality of stub tubes 46 welded thereto. Stub tubes 46 are substantially cylindrical and each stub tube 46 has a bore (not shown) extending therethrough. The bore of each stub tube 46 is aligned with an opening (not shown) in bottom head dome 44. Components such as control rod drives, incore instruments, pressure instrument nozzles, and drain nozzles extend through such bottom head dome openings and stub tube bores and penetrate into RPV 10.

FIG. 1 is provided primarily for illustrative purposes to show a typical RPV 10. The present invention, as described below, can be used in many RPV configurations other than RPV 10.

Mechanical wear, thermal cracking, and stress corrosion cracking (SCC) are known phenomena occurring in reactor components, such as nozzles 28, 32, 36, 38 and 40, piping and valves. Before repairing, modifying or otherwise upgrading a valve, for example, it is desirable to accurately map, or measure, the existing valve roundness, diameter, sealing surface condition, concentricity and length. Until now, it was believed that an operator must enter the valve bore to manually measure the valve.

The following discussion of a mapping apparatus sometimes refers specifically to mapping a valve. Such mapping apparatus, however, is not limited to mapping valves, and may be used with other components of an RPV, e.g., pipes and nozzles.

Figure 2:
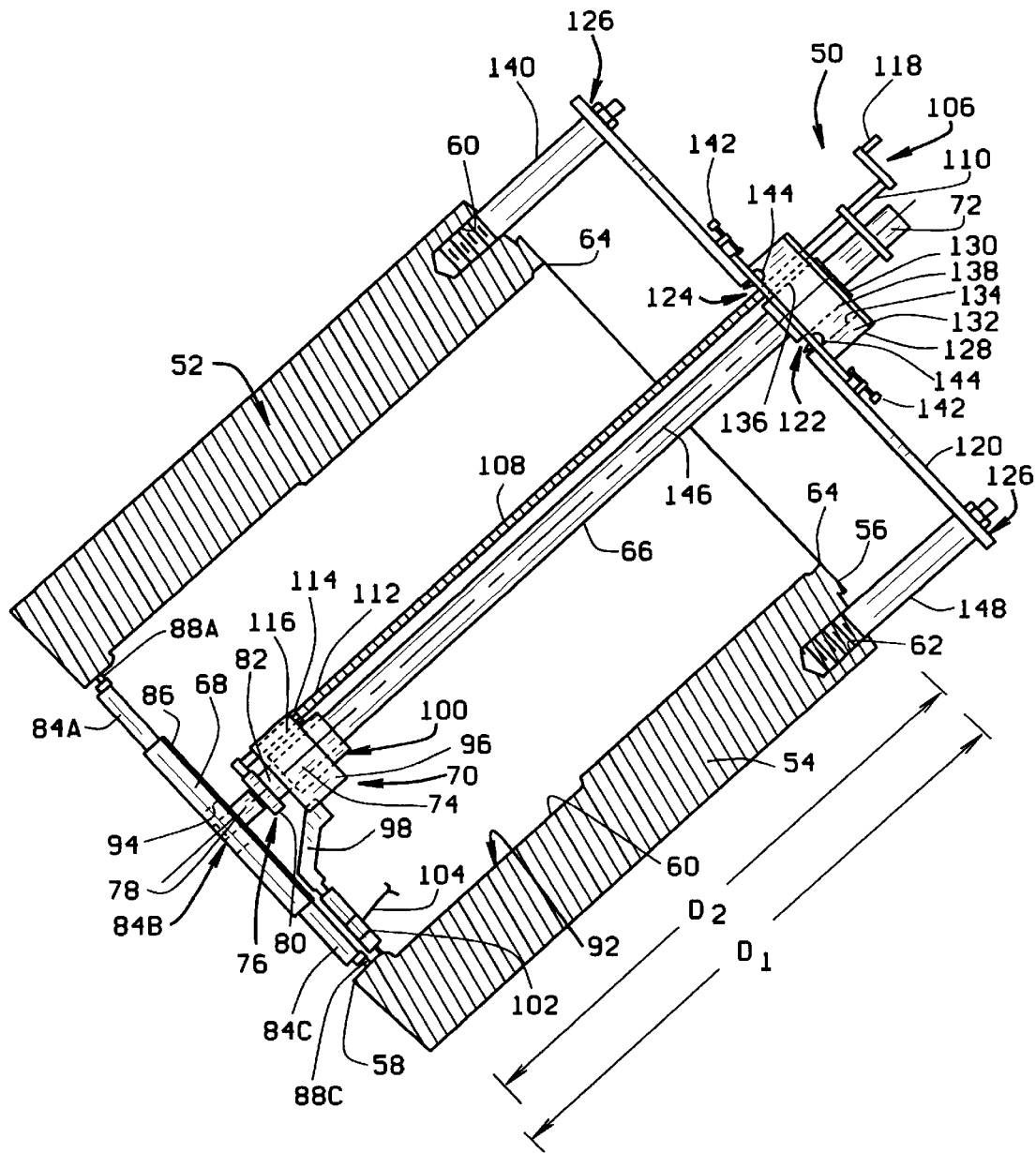
FIG. 2 illustrates a partial cross-section view, with parts cut away, of a mapping apparatus and an RPV valve in accordance with one embodiment of the present invention.

FIG. 2 illustrates a partial cross-section view, with parts cut away, of a mapping apparatus 50 and an RPV valve 52 in accordance with one embodiment of the present invention. RPV valve 52 includes a body portion 54 having a first end 56, a second end 58, and a substantially cylindrical bore 60 extending therethrough between first end 56 and second end 58. First end 56 of body portion 54 further includes several stud bores 62 (only two stud bores 62 are shown in FIG. 2) adjacent a periphery 64 of cylindrical bore 60. RPV valve 52 is well known.

Mapping apparatus 50 includes a main bar 66, an adjustable chuck 68, and a data acquisition element 70. Main bar 66 includes a first end 72 and a second end 74, and is rotatably coupled to adjustable chuck 68. Particularly, second end 74 of main bar 66 is rotatably coupled to adjustable chuck 68 with a substantially spherical bearing 76 having an inner race 78 and an outer race 80. Second end 74 of main bar 66 includes a bearing housing 82 configured to receive outer race 80 of spherical bearing 76. Inner race 72 of spherical bearing 76, however, is secured to adjustable chuck 68.

Adjustable chuck 68 includes four movable jaws 84A, 84B, 84C, and 84D (only jaws 84A, 84B and 84C are shown in FIG. 2) extending from a chuck body 86. Each jaw 84A, 84B, 84C, and 84D is secured to chuck body 86 with a threaded lead screw (not shown in FIG. 2). An outer end 88A, 88B, 88C, and 88D of each jaw 84A, 84B, 84C, and 84D, respectively, is configured to abut a surface 92 of cylindrical bore 60. A chuck jaw driving assembly (not shown in FIG. 2) is coupled to jaws 84A, 84B, 84C, 84D to extend jaws 84A, 84B, 84C, 84D substantially radially from second end 74 of main bar 66. Particularly, right angle drives 90A, 90B, 90C, and 90D (not shown in FIG. 2) are positioned in chuck body 86 for driving respective jaws 84A, 84B, 84C, 84D, substantially radially from second end 74 of main bar 66 so that outer ends 88A, 88B, 88C, and 88D abut valve bore surface 92. Each right angle drive 90A, 90B, 90C, and 90D may, for example, include a worm and a worm gear. Adjustable chuck body 86 includes a substantially centered bearing opening 94, which is sized to securably receive inner race 82 of spherical bearing 76 therein.

Data acquisition element 70 includes a data acquisition housing 96 having a data acquisition probe 98 extending therefrom. A data acquisition bearing 100 is secured within data acquisition housing 96, and movably couples data acquisition housing 96 to main bar 66. Particularly, data acquisition bearing 100 is a substantially linear bearing and is coupled to main bar 66 so that data acquisition housing is configured to move substantially coaxially with respect to main bar 66. As shown in FIG. 2, data acquisition bearing 100, and thus data acquisition housing 96, is coupled to main bar 66 at a location between second end 74 and first end 72 of main bar 66.

Data acquisition probe 98 extends from data acquisition housing 96 and is configured to obtain data measurements, e.g., roundness, diameter, and sealing surface condition, of valve bore surface 92. For example, data acquisition probe 98 may include a digital indicator 102 which is coupled to a processor (not shown in FIG. 2) with a cable 104. Alternatively, data acquisition probe 98 may include a laser (not shown in FIG. 2) configured to obtain data measurements of valve bore surface 92. To improve the range of the laser, the laser may be coupled to data acquisition housing 96 with an adjustable bracket (not shown in FIG. 2). A two way air cylinder (not shown in FIG. 2), may then be used, for example, to extend and retract the laser. Digital indicators and lasers configured to obtain data measurement relating to bore surfaces are known. Similarly, two way air cylinders and adjustable brackets are known.

Mapping apparatus 50 further includes a data acquisition drive assembly 106 for driving data acquisition housing 96 substantially coaxially to main bar 66. Drive assembly 106 includes a lead screw 108 having a first end 110 and a second end 112. First end 110 of lead screw 108 is coupled to first end 72 of main bar 66. Second end 112 of lead screw 108 similarly is coupled to second end 74 of main bar 66 so that lead screw 108 and main bar 66 are substantially parallel. Particularly, data acquisition housing 96 includes a threaded feed nut 114 secured to housing 96 and aligned with a lead screw bore 116 extending through housing 96. Second end 112 of lead screw 108 is threadedly coupled with feed nut 144, i.e., extends through threaded feed nut 114 and lead screw bore 116, so that rotational movement of lead screw 108 causes data acquisition housing 96 to move substantially coaxially to main bar 66. Drive assembly 106 further includes a crank handle 118 coupled to first end 110 of lead screw 108 for rotating lead screw 108.

Mapping apparatus 50 also includes a mounting plate 120 having a main bar opening 122, a lead screw opening 124 and three stud adapter openings 126 (only two stud adapter openings 126 are shown in FIG. 2) therein. Lead screw 108 extends through lead screw opening 124 so that mounting plate 120 is positioned between first end 110 of lead screw 108 and second end 112 of lead screw 108. Similarly, main bar 66 extends through main bar opening 122 so that mounting plate 120 is positioned between first end 72 of main bar 66 and second end 74 of main bar 66. Particularly, first end 72 of main bar 66 extends through a main bearing housing 128 which is secured to mounting plate 120 adjacent main bar opening 122. A substantially linear bearing 130 and a substantially spherical bearing 132 are mounted within bearing housing 128. Substantially linear bearing 130 is coupled at an inner race 134 to main bar 66 and at an outer race 136 to substantially spherical bearing 132. More specifically, outer race 136 is secured to spherical bearing 132 with a bronze bushing 138. Main bearing housing 128 is secured to mounting plate 120 utilizing three adjusting screws 142 (only two adjusting screws 142 are shown in FIG. 2) and four locking screws 144 (only two locking screws 144 are shown in FIG. 2). Adjusting screws 142 are substantially perpendicular to a centerline axis 146 of main bar 66 and configured to move main bearing housing 128 substantially perpendicular to main bar axis 146. Locking screws 144, however, are substantially parallel to main bar axis 146 and configured to secure main bearing housing 128 to mounting plate 120.

Figure 3:
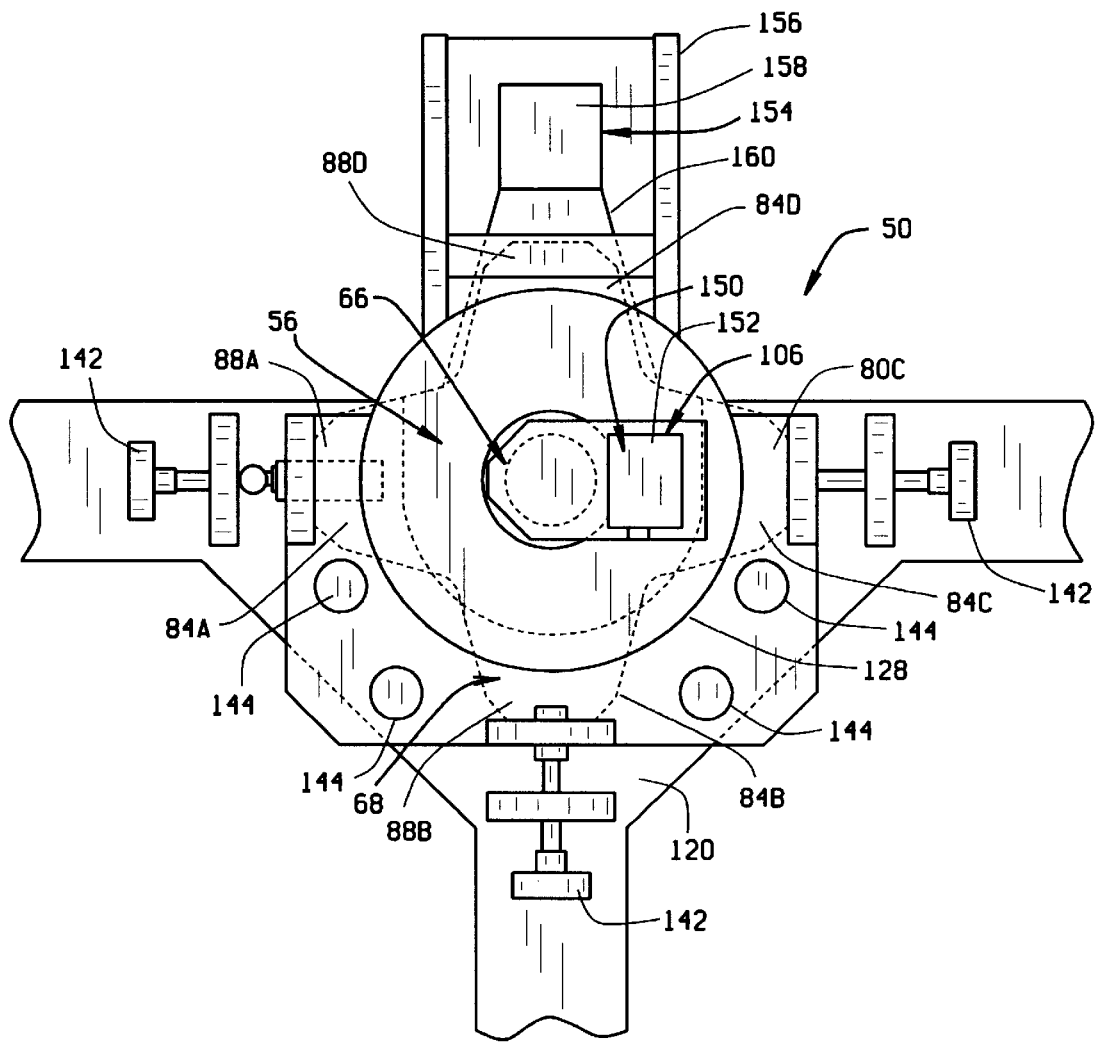
FIG. 3 is a top view schematic illustration of the mapping apparatus shown in FIG. 2.

FIG. 3 is a top view schematic illustration of mapping apparatus 50. As described above, mapping apparatus 50 includes main bar 66, adjustable chuck 68, and data acquisition element 70 (FIG. 2). Second end 74 of main bar 66 is rotatably coupled to adjustable chuck 68 with substantially spherical bearing 76 (FIG. 2). Adjustable chuck 68 includes four movable jaws 84A, 84B, 84C, and 84D extending from chuck body 86, and each jaw 84A, 84B, 84C, and 84D is secured to chuck body 86 with a threaded lead screw (not shown). The chuck jaw driving assembly is coupled to jaws 84A, 84B, 84C, 84D to extend jaws 84A, 84B, 84C, and 84D substantially radially from second end 74 of main bar 66 so that outer ends 88A, 88B, 88C, and 88D abut valve bore surface 92.

Driving assembly 106, as described above, includes lead screw 108 (FIG. 2) which is coupled to data acquisition element 70 so that data acquisition element 70 may move substantially coaxially to main bar 66. To facilitate rotating lead screw 108 from a remote location, driving assembly further includes a lead screw motor assembly 150. Lead screw motor assembly 150 includes a lead screw motor 152 which is coupled to lead screw 108. Particularly, lead screw motor assembly 150 is coupled to lead screw 108 and configured to rotate lead screw 108 to cause data acquisition element 70 to move substantially coaxially to main bar 66. Lead screw motor 152 may, for example, be a DC servo motor and may be controlled, for example, by a processor (not shown in FIG. 3).

Main bearing housing 128, as shown more clearly in FIG. 3, is secured to mounting plate 120 utilizing three adjusting screws 142 and four locking screws 144. Adjusting screws 144 are substantially perpendicular to main bar axis 146 and configured to move main bearing housing 128 substantially perpendicular to main bar axis 146. Locking screws 144, however, are substantially parallel to main bar axis 146 and configured to secure main bearing housing 128 to mounting plate 120.

To facilitate rotating main bar 66 from a remote location, a bar rotation motor assembly 154 is coupled to main bar 66. Bar rotation motor assembly 154 includes a motor mounting bracket 156, a bar rotation motor 158 and a drive belt 160. Bar rotation motor 158 is coupled to main bar 66 with motor mounting bracket 156, and drive belt 160 is positioned about the circumference of main bar 66 so that bar rotation motor 158 drives drive belt 160 to rotate main bar 66. Bar rotation motor 158 may, for example, be a DC servo motor. Bar rotation motor 158 may be controlled, for example, by the same processor controlling lead screw motor 154.

To map valve bore 60 with mapping apparatus 50, mounting plate 120 is positioned adjacent first end 56 of valve body portion 54, and three stud adapters 148 (only two stud adapters 148 are shown in FIG. 2) are extended through respective stud adapter openings 126 and into three of stud adapter bores 62 to couple mounting plate 120 to valve body portion 54. Main bar 66 and lead screw 108 are advanced into valve bore 60 so that chuck body 86 of adjustable chuck 68 is a distance $D_1$ from first end 56 of valve body portion 54. The chuck jaw driving assembly, e.g., right angle drives 90A, 90B, 90C, and 90D, then drives adjustable chuck jaws 84A, 84B, 84C, and 84D so that outer ends 88A, 88B, 88C, and 88D abut valve bore surface 92 and substantially center second end 74 of main bar 66 within valve bore 60. Adjusting screws 142 are utilized, i.e., rotated, to position main bar 66 substantially concentrically within valve bore 60. After substantially centering main bar 66 within valve bore 60, locking screws 144 are utilized, i.e., rotated, to secure main bearing housing 128 to mounting plate 120 and substantially prevent main bar 66 movement perpendicular to main bar axis 146.

Lead screw 108 is then rotated, e.g., with crank handle 118 or lead screw motor assembly 150, to position data acquisition probe 98, and thus digital indicator 102, at a first location a distance $D_2$ from first end 56 of valve body portion 54. Data acquisition probe 98 and digital indicator 102 are then rotated about main bar 146 to collect data of bore surface 92 about the circumference of bore 60 at distance $D_2$. Particularly, main bar 66 is rotated, e.g., manually or with main bar motor assembly 154, about axis 146. Spherical bearings 76 and 132 facilitate such rotational movement. Data obtained by data acquisition probe 98 is then supplied to the processor via cable 104. In accordance with one embodiment, each of the data measurements may be pre-programmed in the processor to facilitate, i.e., obtain, fully automatic mapping.

After obtaining data of bore surface 92 about the circumference of bore 60 at distance $D_2$, lead screw 108 is rotated to position data acquisition probe 98 at a second location a distance $D_3$ from first end 56 of valve body portion 54. Data is then collected about the circumference of bore 60 at distance $D_3$ the same manner as described above. Accordingly, substantially entire distance $D_1$ of valve bore 60 may be mapped by positioning data acquisition probe 98 at various locations along distance $D_1$.

The above-described embodiment facilitates automatic remote rotation of both the main bar and the lead screw. However, the embodiment is not meant to be limiting. For example, while the main bar motor and the lead screw motor described above were DC servo motors, other motors may be utilized. Similarly, while both such motors were described as being controlled by the same processor, different processors may be used to control the different motors.

The above-described embodiment facilitates measuring a valve bore without requiring an operator to enter the valve bore. Such embodiment also facilitates quicker and more accurate valve bore mapping than known methods. However, the present invention is not limited to the embodiment set forth above. For example, while the adjustable chuck described above includes four jaws, the chuck may include either more or fewer than four jaws. Moreover, the adjustable chuck may be a self centering chuck. Similarly, while the above-described embodiment illustrates utilizing a digital indicator to map the valve bore, a laser or other data acquisition device may be used.

From the preceding description of the present invention, it is evident that the objects of the invention are attained. Although the invention has been described and illustrated in detail, it is to be clearly understood that the same is intended by way of illustration and example only and is not be taken by way of limitation. For example, adjustable chuck described herein includes 4 jaws, however the adjustable chuck may include a different number of jaws, such as 2, 3, or 5 jaws. In addition, the data acquisition drive assembly described herein is a rotatable lead screw. However, the data acquisition drive assembly may be substantially translatable. Furthermore, the magazine assembly described herein included three adjusting screws, however, either fewer of more adjusting screws can be used. Accordingly, the spirit and scope of the invention are to be limited only by the terms of the appended claims.

What is claimed is:

1. A mapping assembly for mapping pipe and valve bores in a nuclear reactor, said assembly comprising:

a main bar having a first end and a second end;

an adjustable chuck rotatably coupled to said main bar second end, said chuck comprising a plurality of movable jaws; and a data acquisition element movably coupled to said main bar between said main bar first end and said main bar second end, said data acquisition element movable substantially coaxially along said main bar.

2. A mapping assembly in accordance with claim 1 further comprising a data acquisition drive assembly for moving said data acquisition element substantially coaxially to said main bar.

3. A mapping assembly in accordance with claim 2 wherein said data acquisition element comprises a data acquisition housing and a linear bearing, said linear bearing secured within said housing and movably coupled to said main bar, and wherein said data acquisition drive assembly comprises a lead screw threadedly coupled with said data acquisition housing.

4. A mapping assembly in accordance with claim 3 wherein said drive assembly further comprises a motor coupled to said lead screw for rotating said lead screw.

5. A mapping assembly in accordance with claim 1 wherein said data acquisition element includes a digital indicator.

6. A mapping assembly in accordance with claim 1 wherein said data acquisition element includes a laser.

7. A mapping assembly in accordance with claim 1 further comprising a motor coupled to said main bar for rotating said main bar.

8. A mapping assembly in accordance with claim 1 further comprising a mounting plate, said mounting plate including a main bar opening, and wherein said main bar extends through said main bar opening so that said mounting plate is positioned between said main bar first end and said main bar second end.

9. A mapping assembly in accordance with claim 8 further comprising:

a main bearing housing coupled to said main bar adjacent said first end of said main bar;

a plurality of locking screws to secure said main bearing housing to said mounting plate; and a plurality of adjusting screws configured to move said main bearing housing in a direction perpendicular to the centerline axis of said main bar.

10. A method for mapping valve and pipe bores in a nuclear reactor utilizing a mapping assembly including a main bar having a first end and a second end, an adjustable chuck rotatable coupled to the main bar second end, the chuck comprising a plurality of movable jaws, and a data acquisition element coupled to the main bar between the main bar first end and the main bar second end, the data acquisition element movable coaxially to the main bar, said method comprising the steps of:

positioning the main bar concentrically within the bore;

moving the data acquisition element axially along the main bar to a first location relative to the bore; and rotating the main bar about its centerline axis to rotate the data acquisition element about the main bar centerline axis.

11. A method in accordance with claim 10 wherein the adjustable chuck comprises a plurality of movable jaws, each jaw having an outer end configured to abut a surface of the bore, and wherein positioning the main bar concentrically within the bore comprises the step of extending the chuck jaws substantially radially from the second end of the main bar so that the outer end of each jaw abuts the bore surface.

12. A method in accordance with claim 10 further comprising the steps of moving the data acquisition element axially along the main bar from the first location relative to the bore to a second location relative to the bore, and rotating the main bar about its centerline axis to rotate the data acquisition element about the main bar centerline axis.

13. A method in accordance with claim 10 wherein the mapping assembly further includes a lead screw threadedly coupled to the data acquisition element, and the data acquisition element includes a substantially linear bearing coupled to the main bar, and wherein moving the data acquisition element axially along the main bar comprises the step of rotating the lead screw.

14. A method in accordance with claim 10 further comprising the steps of:

moving the data acquisition element axially along the main bar a predetermined distance from the first location relative to the bore and rotating the main bar about its centerline axis to rotate the data acquisition element about the main bar centerline axis; and repeating the step of moving the data acquisition element axially along the main bar a predetermined distance and rotating the main bar about its centerline until the data acquisition element has been moved from the first location to a location adjacent an end of the main bar.

* * * * *